US006968401B2

(12) United States Patent
McBrearty et al.

(10) Patent No.: US 6,968,401 B2
(45) Date of Patent: Nov. 22, 2005

(54) METHOD, SYSTEM, AND PROGRAM FOR MAINTAINING AND SWAPPING PATHS IN AN MPIO ENVIRONMENT

(75) Inventors: Gerald Francis McBrearty, Austin, TX (US); Chris Alan Schwendiman, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 10/607,516

(22) Filed: Jun. 26, 2003

(65) Prior Publication Data

US 2004/0267980 A1 Dec. 30, 2004

(51) Int. Cl.[7] .................................................. G06F 3/00
(52) U.S. Cl. .......................................... 710/38; 710/74
(58) Field of Search ............................. 710/38, 43, 74; 714/3, 5–8, 30

(56) References Cited

U.S. PATENT DOCUMENTS 6,675,258 B1 * 1/2004 Bramhall et al. ........... 711/114
2003/0172331 A1 * 9/2003 Cherlan et al. ............. 714/712
2004/0107300 A1 * 6/2004 Padmanabhan et al. ........ 710/1
2004/0172636 A1 * 9/2004 Do et al. .................... 719/321

OTHER PUBLICATIONS http://www.emc.com/products/software/powerpath.jsp, Power Path, “The Big Picture”, Mar. 26, 2003, p. 1.
http://stage.caldera.com/products/Whitepapers/uw7wpmay/lookinside.html, “UnixWare 7—A Look Inside”, Mar. 26, 2003, pp. 1-22.
Barnett, IBM, Multi-path I/O for AIX 5L Version 5.2, white paper, pp. 1-13.

* cited by examiner

*Primary Examiner*—Kim Huynh
*Assistant Examiner*—Harold Kim
(74) *Attorney, Agent, or Firm*—Duke W. Yee; Marilyn Smith Dawkins; Stephen R. Tkacs

(57) ABSTRACT

A path control module manages a set of primary paths and a set of standby paths for a target device. When a path in the set of primary paths fails, the path control module may failover to the set of standby paths. Alternatively, when a path in the set of primary paths fails, the path control module may failover that path to a single path from the set of standby paths. The sets of primary paths and standby paths may be set by an administrator to control load balancing of resources in the storage area network. The primary set of paths for a first disk may be the standby set of paths for a second disk. Similarly, the primary set of paths for the second disk may be the standby set of paths for the first disk.

20 Claims, 4 Drawing Sheets

200
210
OPERATING SYSTEM
220
DEVICE DRIVER
PATH CONTROL MODULE
224
222
PRIMARY PATHS
STANDBY PATHS

METHOD, SYSTEM, AND PROGRAM FOR MAINTAINING AND SWAPPING PATHS IN AN MPIO ENVIRONMENT

BACKGROUND OF THE INVENTION

1. Technical Field

The present invention relates to storage area networks and, in particular, to multiple path input/output environments. Still more particularly, the present invention provides a method, system, and program for maintaining and swapping paths in a multiple input/output environment.

2. Description of Related Art

A storage area network (SAN) is a network of storage devices. In large enterprises, a SAN connects multiple machines to a centralized pool of disk storage. Compared to managing hundreds of servers, each with their own storage devices, a SAN improves system administration.

In multiple path input/output (MPIO), there is a plurality of routes or connections from one specific machine to one specific device. For example, with a logical disk device on a redundant array of independent disks (RAID), the accessing host uses a fibre channel (FC) adapter connected to an FC switch, and the FC switch in turn is attached to the RAID array. There may be eight, or as many as thirty-two or more, FC adapters in both the host and the device.

Considering a SAN with eight adapters in the host and the device, if each host adapter is connected to a device adapter through a switch, then there may be eight paths from the host to the device. If the switches are interconnected, then there may be many more paths from the host to the device.

All of the MPIO solutions today use a simple round robin among all of the available paths. When a path fails, it is removed from the round robin until the failed element is restored. This approach does not provide much load balancing among the physical resources in the SAN, e.g., the FC switches. In other words, paths in the round robin may be using the same resources.

Therefore, it would be advantageous to provide an improved mechanism for load balancing and failover for paths in an MPIO environment.

SUMMARY OF THE INVENTION

The present invention provides a path control module that manages a set of primary paths and a set of standby paths for a target device. The path control module may be a dynamically loadable extension to the device driver. When a path in the set of primary paths fails, the path control module may failover to the set of standby paths. Alternatively, when a path in the set of primary paths fails, the path control module may failover that path to a single path from the set of standby paths. The sets of primary paths and standby paths may be set by an administrator to control load balancing of resources in the storage area network.

There may be two or more storage devices connected to the same set of target host channel adapters. The primary set of physical paths for a first disk may be the standby set of Physical paths for a second disk. Similarly, the primary set of physical paths for the second disk may be the standby set of physical paths for the first disk. Thus, the path control module may also balance load among physical paths to the disks.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
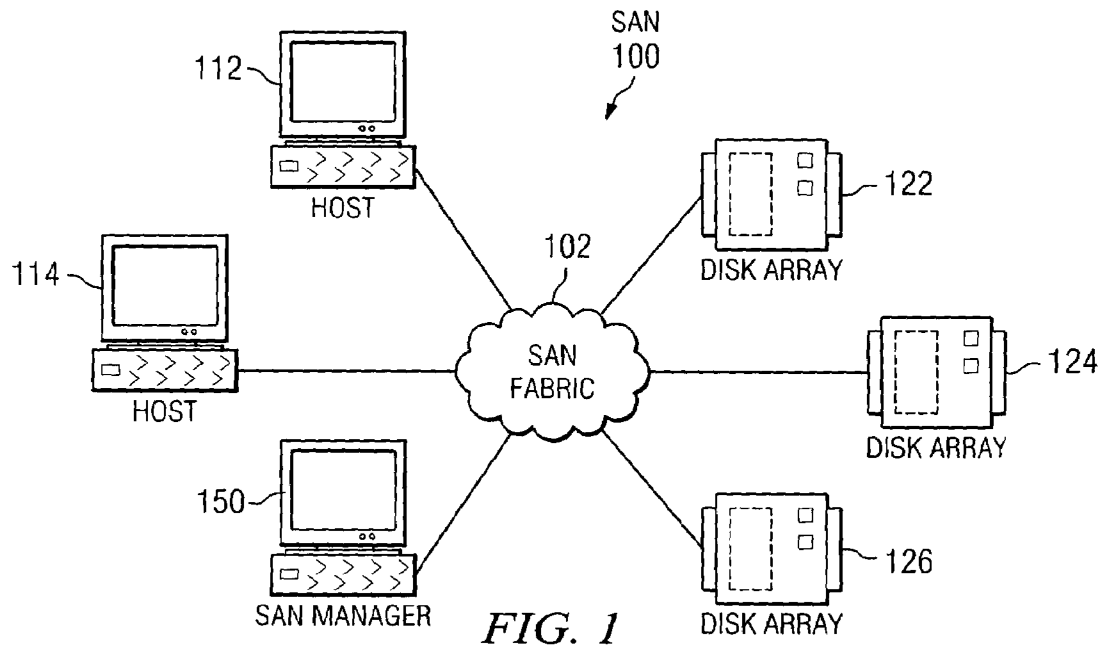
FIG. 1 depicts a pictorial representation of a storage area network in which the present invention may be implemented.

With reference now to the figures, FIG. 1 depicts a pictorial representation of a storage area network in which the present invention may be implemented. Storage area network (SAN) 100 contains SAN fabric 102, which is a combination of interconnected switches, which collectively provide a routing infrastructure within SAN 100.

In the depicted example, hosts 112, 114 are connected to fabric 102 along with disk arrays 122, 124, 126. Hosts 112, 114 may be, for example, personal computers, network computers, servers, or the like. In the depicted example, hosts 112, 114 access disk arrays 122, 124, 126 through paths in the SAN fabric. SAN 100 may include additional hosts and/or other storage devices not shown. FIG. 1 is intended as an example, and not as an architectural limitation for the present invention.

Figure 2:
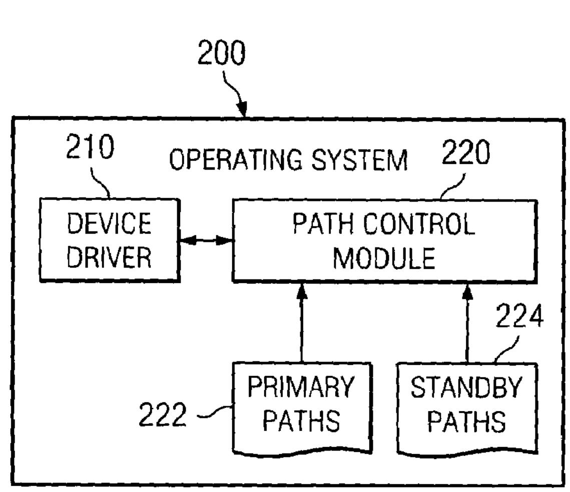
FIG. 2 is a block diagram illustrating a software configuration of an operating system within a host computer in accordance with a preferred embodiment of the present invention.

FIG. 2 is a block diagram illustrating a software configuration of an operating system within a host computer in accordance with a preferred embodiment of the present invention. Operating system 200 includes device driver 210 for a storage device on a storage area network. A storage device may be a physical disk drive; however, more often, a storage device will be a logical storage device within an array of disks, such as a redundant array of independent disks (RAID) system. The operating system also includes path control module (PCM) 220, which determines paths through the switch fabric from the host to the storage device. The PCM may be a dynamically loaded extension of the device driver.

The PCM chooses a path for each transaction between the host and the device. In a round robin approach, the PCM cycles through a set of paths through the fabric. In the prior art this set of paths includes all possible paths. However, this approach does not provide much load balancing among the physical resources in the SAN, e.g., the host bus adapters and switches. In other words, physical paths in the round robin may be using the same physical resources.

In accordance with a preferred embodiment of the present invention, PCM 220 is provided with a set of primary paths 222 and a set of standby paths 224. When a path in the set of primary paths fails, the path control module may failover to the set of standby paths. Alternatively, when a path in the set of primary paths fails, the path control module may failover that path to a single path from the set of standby paths. The sets of primary paths and standby paths may be set by an administrator to control load balancing of resources in the storage area network.

There may be two or more storage devices connected to the same host. There will be a device driver, a PCM, a set of primary paths, and a set of standby paths for each storage device. The primary set of paths for a first disk may be the standby set of paths for a second disk. Similarly, the primary set of paths for the second disk may be the standby set of paths for the first disk. Thus, the path control module may also balance load among disks.

The PCM may reestablish a failed path and put it back into failback service. The administrator may be notified about a pat that cannot be reestablished and the PCM may automatically coordinate with a SAN manager to have an additional path added for this device for failover.

Returning to FIG. 1, SAN manager 150 is a device connected to SAN fabric 102. A SAN manager may enable new connections or paths from a host bus adapter (HBA) to the device by "zoning in" new HBA's or new switches. Switches and hubs typically support a feature called "zoning" where if you are "in " you can see the device, and if you are "out" you cannot see the device. The SAN manager can query and establish, this zoning in order to zone in new physical paths if need be. After the path is zoned in, the SAN manager can configure the new path to the device on the target machine. When the new path is configured on the target machine the PCM would be notified of the new path and could add it as a standby path.

FIGS. 3A–3D depict example storage area network configurations in accordance with a preferred embodiment of the present invention. More particularly, with respect to FIG. 3A, host 310 is connected to a plurality of host bus adapters 312, 314, 316, 318. In the depicted example, the target device is disk array 320. The disk array is connected to host bus adapters 322, 324, 326, 328. Host bus adapter 312 is connected to host bus adapter 322 through fibre channel (FC) switch 1 332. Similarly, host bus adapter 314 is connected to host bus adapter 324 through FC switch 2 334, host bus adapter 316 is connected to host bus adapter 326 through FC switch 3 336, and host bus adapter 318 is connected to host bus adapter 328 through FC switch 4 338.

Figure 3A:
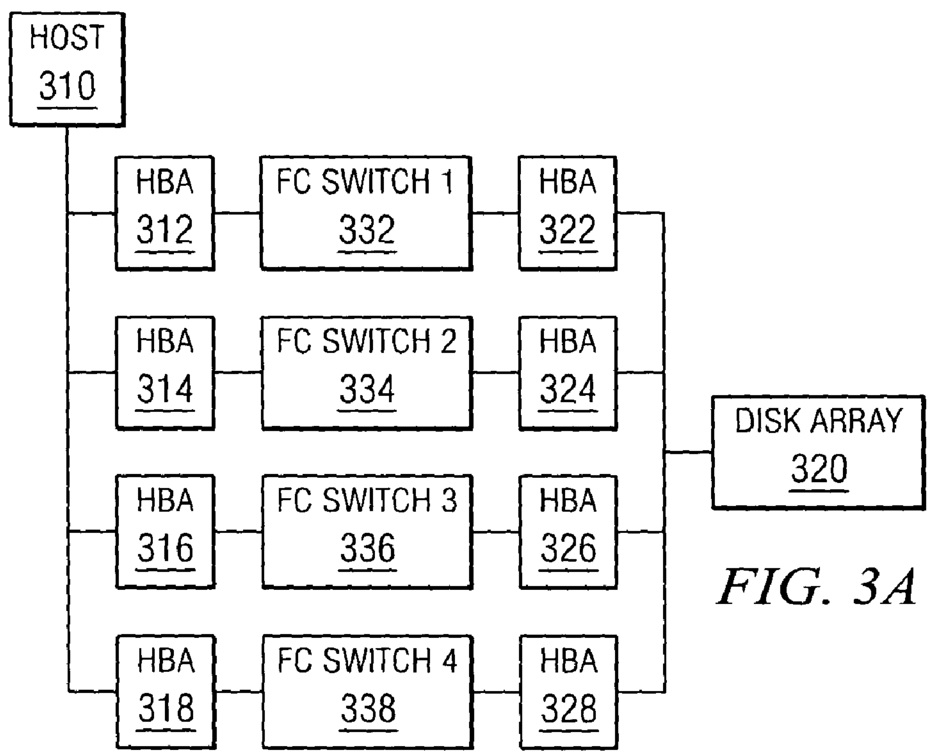
FIGS. 3A–3D depict example storage area network configurations in accordance with a preferred embodiment of the present invention.

In the example shown in FIG. 3A, there are four possible paths. As such, the possible paths are as follows:

1. HBA 312, FC switch 1 332, HBA 322 (312-332-322)
2. HBA 314, FC switch 2 334, HBA 324 (314-334-324)
3. HBA 316, FC switch 3 336, HBA 326 (316-336-326)
4. HBA 318, FC switch 4 338, HBA 328 (318-338-328)

In accordance with a preferred embodiment of the present invention, the PCM for the device may be provided with a set of primary paths, including paths 1 and 2, and a set of standby paths, including paths 3 and 4.

The host and the disk array are connected to the SAN fabric through four host bus adapters. Typically, a host or disk array will be connected to between eight and thirty-two host bus adapters; however, more or fewer host bus adapters may be connected depending upon the implementation.

Figure 3B:
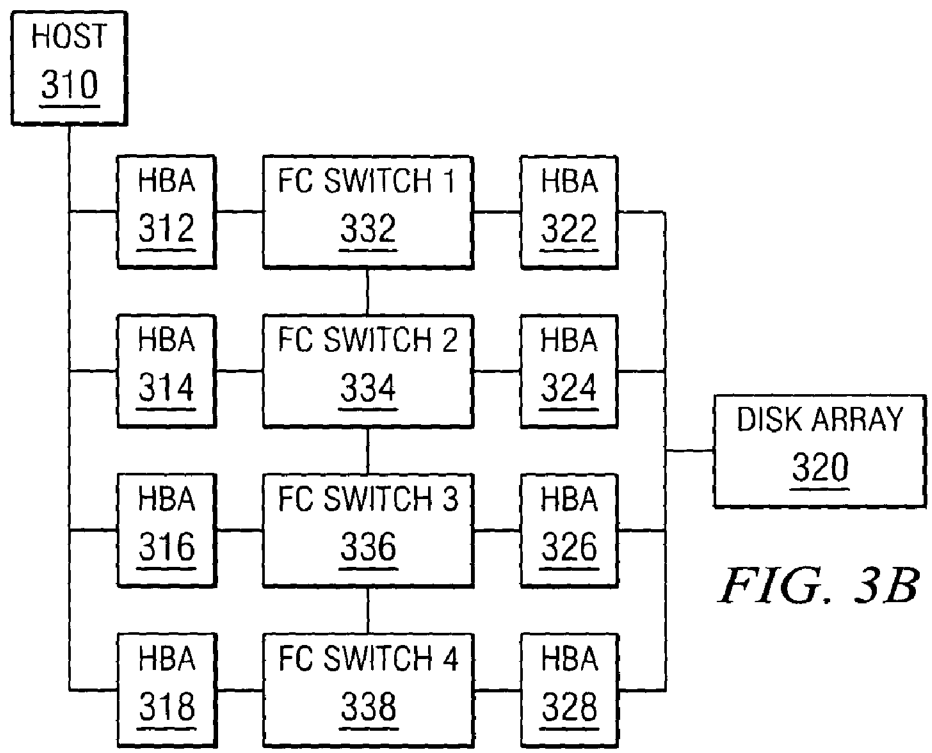

More paths are possible through the SAN fabric if the FC switches are interconnected. As shown in FIG. 3B, FC switch 1 332 is connected to FC switch 2 334. Similarly, FC switch 2 is connected to FC switch 3 336 and FC switch 3 is connected to FC switch 4 338. With interconnection between the switches, the number of paths grows considerably. In this example, there are sixteen paths from the host to the device.

Figure 3C:
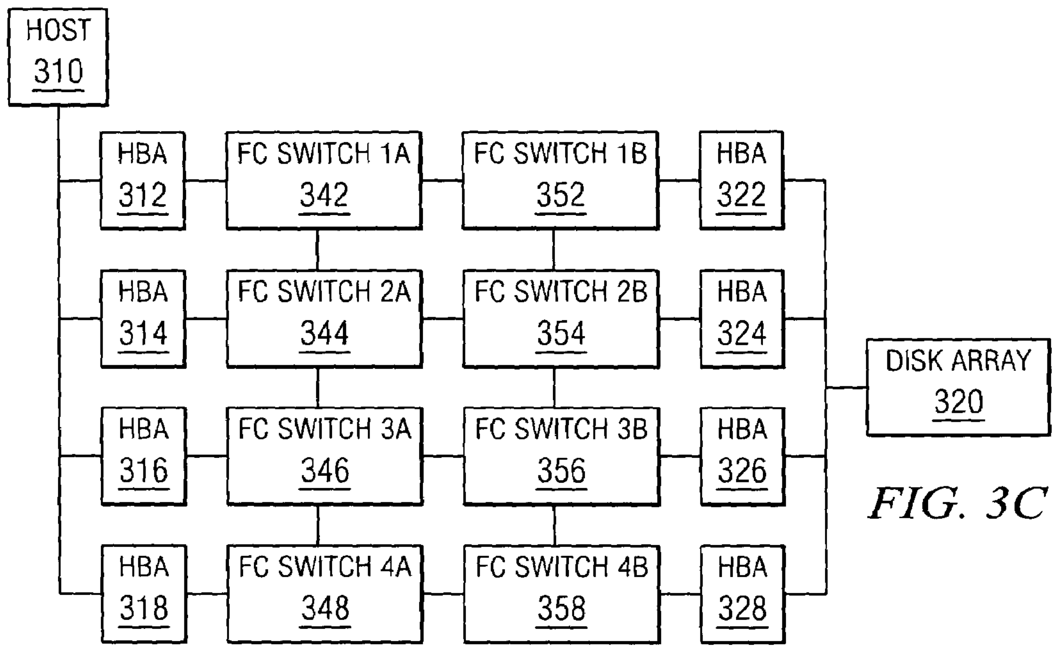

Turning now to FIG. 3C, an example storage area network with two levels of switches is shown. HBA 312 is connected to HBA 322 through FC switch 1A 342 and FC switch 1B 352. Similarly, HBA 314 is connected to HBA 324 through FC switch 2A 344 and FC switch 2B 354, HBA 316 is connected to HBA 326 through FC switch 3A 346 and FC switch 3B 356, and HBA 318 is connected to HBA 328 through FC switch 4A 348 and FC switch 4B 358.

The switches are also interconnected. As shown in this example, FC switch 1A 342 is connected to FC switch 2A 344. Similarly, FC switch 2A is connected to FC switch 3A 346 and FC switch 3A is connected to FC switch 4A 348. Also switch 1B 352 is connected to FC switch 2B 354, FC switch 2B is connected to FC switch 3B 356, and FC switch 3B is connected to FC switch 4B 358.

With interconnection between the switches and multiple levels of switches, the number of paths can become extensive. In addition, many of the paths share resources. Therefore, in accordance with a preferred embodiment of the present invention, the sets of primary paths and standby paths are chosen by an administrator to control load balancing of resources in the storage area network.

Figure 3D:
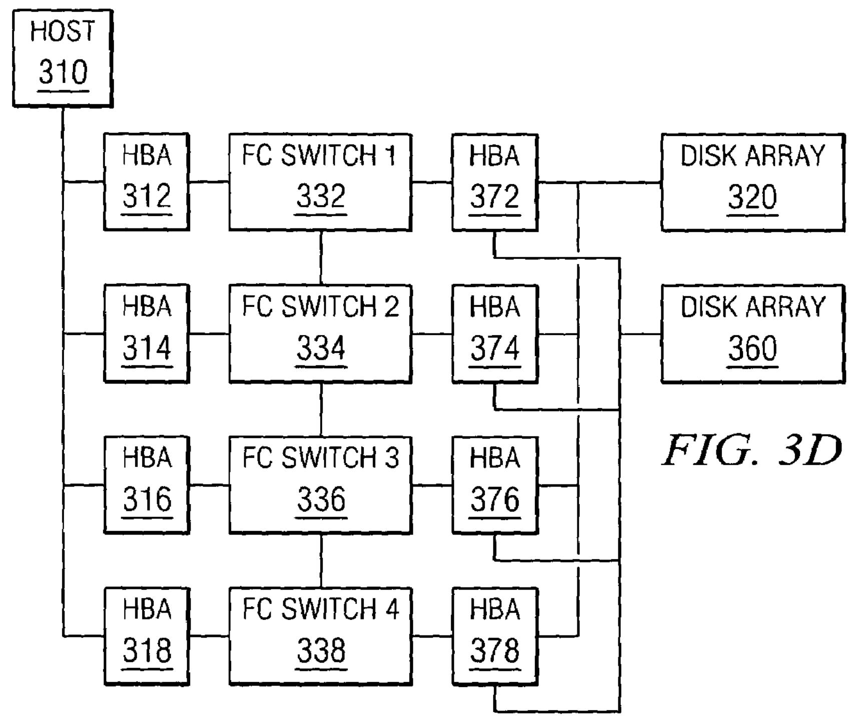

Next, with reference to FIG. 3D, an example of a storage area network is shown with two storage devices connected to the same set of host bus adapters. Host bus adapters 372, 374, 376, 378 may be connected to disk array 320 and disk array 360. Therefore, the path 312-332-372 may be used for a transaction between host 310 and disk array 320 or for a transaction between host 310 and disk array 360. The paths for the two storage devices share common resources.

In accordance with a preferred embodiment of the present invention, the PCM in host 310 for disk array 320 is provided with a set of primary paths and a set of secondary paths. Similarly, the PCM in host 310 for disk array 360 is provided with another set of primary paths and another set of secondary paths.

For example paths 312-332-372, 312-332-334-374, 314-334-332-372, and 314-334-374 may be primary paths for disk array 320. Paths 316-336-376, 316-336-338-378, 318-338-336-376, and 318-338-378 may be primary paths for disk array 360. Thus, the administrator may perform load balancing of the paths through the SAN fabric by setting the primary paths. Also, the primary set of paths for disk array 320 may be the standby set of paths for disk array 360. Similarly, the primary set of paths for disk array 360 may be the standby set of paths for disk array 320.

In the above example, only a subset of all the available paths is used. More or fewer paths may be used by the overall invention. As a further example, given sixteen paths in FIG. 3D, ten paths may be primary paths for disk array 320, while only six paths are primary paths for disk array 360. The sets of primary paths and the sets of standby paths may be set to most efficiently balance the load of the resources in the SAN fabric.

In a preferred embodiment, the PCM may order active paths such that requests are load balanced across the physical paths to the disks. If there is a common host bus adapter or switch on several of the physical paths to the disk, then the PCM may order the active paths such that it sends each successive request down a different physical path to the disk. Each successive request will go through a different host bus adapter than the previous request. The PCM may also round robin requests within a specific adapter such that each time a new request is sent through an adapter a different physical path from that adapter to the disk will be used.

Figure 4:
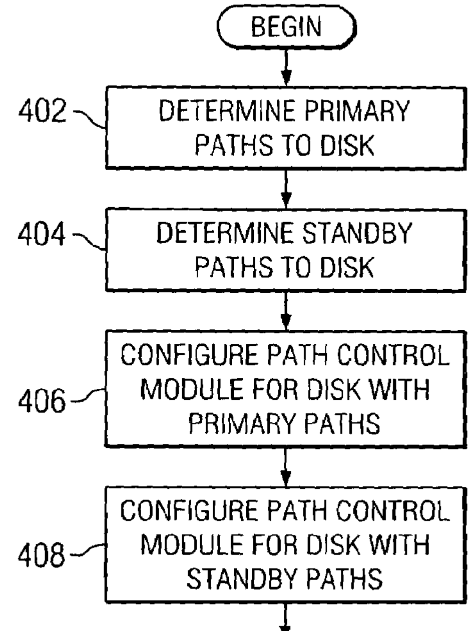
FIG. 4 is a flowchart illustrating the operation of configuring a path control manager in accordance with a preferred embodiment of the present invention.

With reference now to FIG. 4, a flowchart illustrating the operation of configuring a path control manager is shown in accordance with a preferred embodiment of the present invention. The process begins and an administrator determines a set of primary paths to the disk (step 402) and a set of standby paths to the disk (step 404). Then, the administrator configures the PCM for the disk with the set of primary paths (step 406) and the set of standby paths (step 408). Thereafter, the process ends.

Figure 5A:
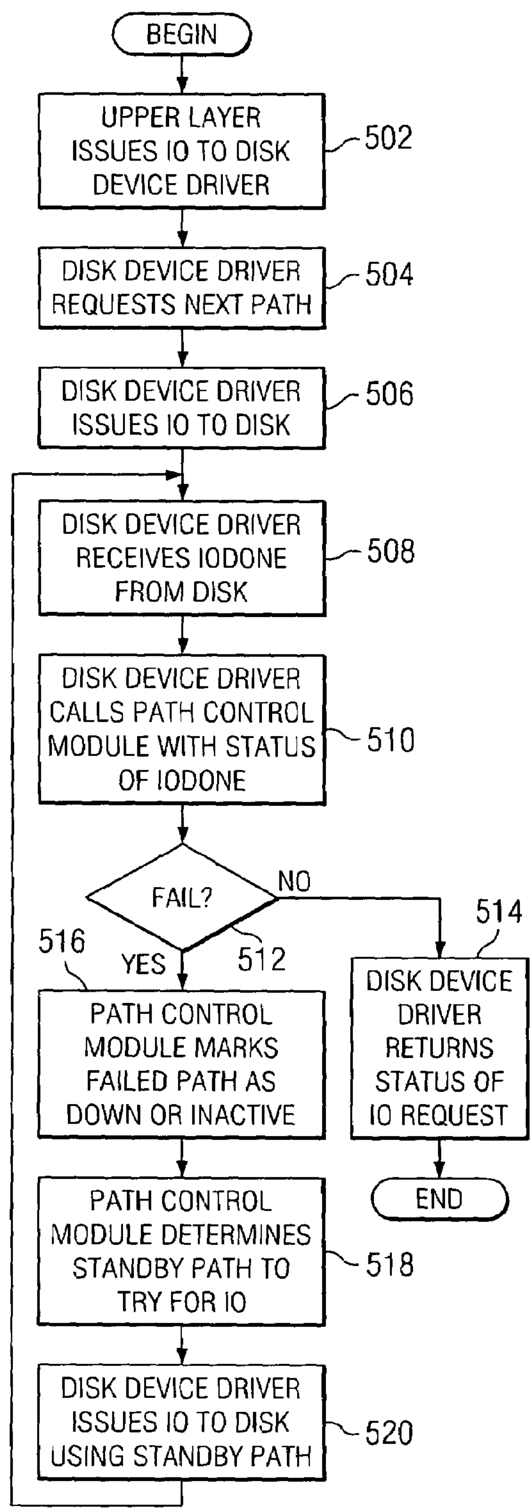
FIG. 5A is a flowchart illustrating the operation of a path control process with individual path failover in accordance with a preferred embodiment of the present invention.

Next, with reference to FIG. 5A, a flowchart illustrating the operation of a path control process with individual path failover is shown in accordance with a preferred embodiment of the present invention. The process begins and the upper layer application, such as a file system issues an IO to the disk device driver (step 502). Then, the disk device driver requests the next path (step 504) and the disk device driver issues the IO to the disk (step 506).

The disk device driver receives an IODONE message from the disk (step 508) and the disk device driver calls the PCM with the status of the IODONE message (step 510). Then, a determination is made as to whether the IO failed (step 512). If the IO did not fail, then the disk device driver returns the status of the IO request to the upper layer (step 514).

If the IO did fail in step 512, the PCM marks the failed path as down or inactive (step 516), the PCM determines a standby path to try for the IO (step 518), and the disk device driver issues the IO to the disk using the standby path (step 520). Then, the process returns to step 508 to receive an IODONE message from the disk. This process may repeat until a standby path is determined for which the IO does not fail. When the PCM is notified that a failed path is restored, then that path may be added back to the set of primary paths and the original standby path is added back to the set of standby paths.

Figure 5B:
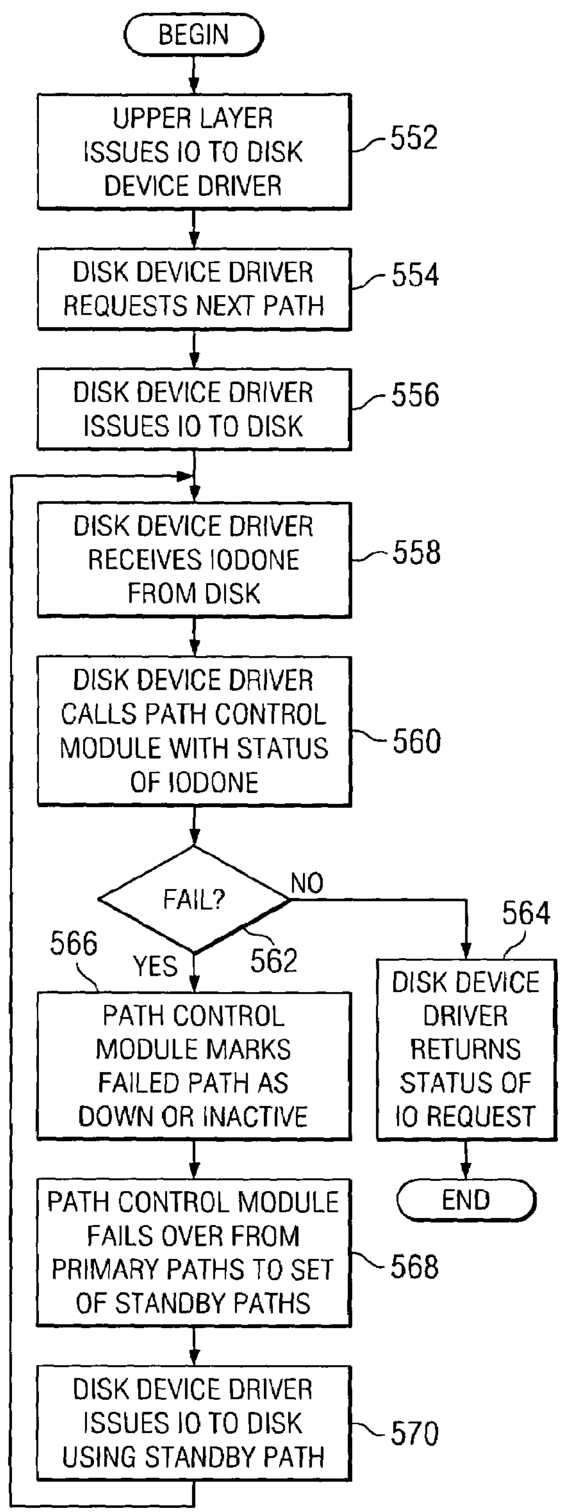
FIG. 5B is a flowchart illustrating the operation of a path control process with entire path set failover in accordance with a preferred embodiment of the present invention.

Turning now to FIG. 5B, a flowchart illustrating the operation of a path control process with entire path set failover is shown in accordance with a preferred embodiment of the present invention. The process begins and the upper layer issues an IO to the disk device driver (step 552). Then, the disk device driver requests the next path (step 554) and the disk device driver issues the IO to the disk (step 556).

The disk device driver receives an IODONE message from the disk (step 558) and the disk device driver calls the PCM with the status of the IODONE message (step 560). Then, a determination is made as to whether the IO failed (step 562). If the IO did not fail, then the disk device driver returns the status of the IO request to the upper layer (step 564).

If the IO did fail in step 562, the PCM marks the failed path as down or inactive (step 566), the PCM fails over from the set of primary paths to the set of standby paths (step 568), and the disk device driver issues the IO to the disk using a standby path from the set of standby paths (step 570). Then, the process returns to step 558 to receive an IODONE message from the disk.

If a path from the set of standby paths fails, then the PCM may remove the path from the set of standby paths. When the PCM is notified that a failed path is again operational, then that path may be added back to the set. If the failed path from the set of primary paths is restored, then the PCM may return to the set of primary paths. The PCM may then fail back from the set of secondary paths to the set of primary paths.

Thus, the present invention solves the disadvantages of the prior art by providing a mechanism for a SAN administrator to control load balancing and failover by configuring a PCM with a set of primary paths and a set of standby paths. The PCM may failover from the set of primary paths to standby paths individually or as a set. The paths may be set such that the most efficient paths are used as the primary paths. Furthermore, when a host is connected to more than one device, the sets of primary paths for the devices may be configured such that the paths are not likely to fight for the same resources.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing multiple path input/output, the method comprising:

receiving a selection of a set of primary paths to be used for issuing transactions to the device, wherein the set of primary paths is a first subset of all available paths for the device;

receiving a selection of a set of standby paths to be used for failover, wherein the set of standby paths is a second subset of all available paths for the device, wherein the first subset and the second subset have no paths in common;

configuring a path control module for a device with the set of primary paths to be used for issuing transactions to the device;

configuring the path control module with the set of standby paths for the device to be used for failover;

issuing transactions to the device using the set of primary paths; and responsive to a path in the primary set of paths failing, failing over using at least one path in the set of standby paths.

2. The method of claim 1, wherein the step of failing over using at least one path in the set of standby paths includes:
determining a first path within the set of primary paths;
issuing a transaction to the device using the first path; and
responsive to the transaction failing, marking the first path as down or inactive and configuring the path control manager to issue transactions to the set of standby paths.

3. The method of claim 2, further comprising:
determining a second path within the set of standby paths; and
issuing the transaction to the device using the second path.

4. The method of claim 2, further comprising:
responsive to the first path being restored, failing back to the set of primary paths.

5. The method of claim 2, wherein first path is determined using a round robin approach.

6. The method of claim 1, wherein the step of failing over using at least one path in the set of standby paths includes:
determining a first path within the set of primary paths;
issuing a transaction to the device using the first path;
responsive to the transaction failing, marking the first path as down or inactive;
determining a second path within the set of standby paths; and
issuing the transaction to the device using the second path, wherein the path control module remains configured to use the set of primary paths to issue transactions.

7. The method of claim 6, further comprising:
responsive to the first path being restored, adding the first path back to the set of primary paths and adding the second path back to the set of standby paths.

8. The method of claim 6, wherein first path is determined using a round robin approach.

9. The method of claim 1, wherein the device is a first device and the path control module is a first path control module, the method further comprising:
configuring a second path control module for the second device with a set of primary paths for the second device, wherein the set of primary paths for the second device is the set of standby paths for the first device; and
configuring the path control module with the set of standby paths for the second device, wherein the set of standby paths for the second device is the set of primary paths for the first device.

10. The method of claim 1, wherein the path control module is a dynamically loaded extension of a device driver for the device.

11. An apparatus for performing multiple path input/output, the apparatus comprising:
a path control module for a device, wherein the path control module is configured with a set of primary paths to be used for issuing transactions to the device, wherein the set of primary paths is a first subset selected from a set of all available paths for the device, and a set of standby paths for the device to be used for failover, wherein the set of standby paths is a second subset selected from the set of all available paths for the device, wherein the first subset and the second subset have no paths in common; and
a device driver for the device, wherein the device driver issues transactions to the device using paths selected from the set of primary paths and, responsive to a path in the primary set of paths failing, fails over using at least one path in the set of standby paths.

12. The apparatus of claim 11, wherein the path control module receives a transaction request from the device driver and determines a first path within the set of primary paths;
wherein the device driver issues a transaction to the device using the first path;
wherein, responsive to the transaction failing, the path control module marks the first path as down or inactive; and
wherein the path control module is configured to issue transactions to the set of standby paths responsive to the transaction failing.

13. The apparatus of claim 12, wherein the path control module determines a second path within the set of standby paths and wherein the device driver issues the transaction to the device using the second path.

14. The apparatus of claim 12, wherein the path control module fails back to the set of primary paths responsive to the first path being restored.

15. The apparatus of claim 11, wherein the path control module determines a first path within the set of primary paths;
wherein the device driver issues a transaction to the device using the first path;
wherein the path control module marks the first path as down or inactive, responsive to the transaction failing;
wherein the path control module determines a second path within the set of standby paths; and
wherein the device driver issues the transaction to the device using the second path, wherein the path control module remains configured to use the set of primary paths to issue transactions.

16. The apparatus of claim 15, wherein the path control modules adds the first path back to the set of primary paths and adds the second path back to the set of standby paths responsive to the first path being restored.

17. A computer program product, in a computer storage medium, for performing multiple path input/output, the computer program product comprising:
instructions for receiving a selection of a set of primary paths to be used for issuing transactions to the device, wherein the set of primary paths is a first subset of all available paths for the device;
instructions for receiving a selection of a set of standby paths to be used for failover, wherein the set of standby paths is a second subset of all available paths for the device, wherein the first subset and the second subset have no paths in common;
instructions for configuring a path control module for a device with the set of primary paths to be used for issuing transactions to the device;
instructions for configuring the path control module with the set of standby paths for the device to be used for failover;
instructions for issuing transactions to the device using paths selected from the set of primary paths; and
instructions, responsive to a path in the primary set of paths failing, for failing over using at least one path in the set of standby paths.

18. The computer program product of claim 17, wherein the instructions for failing over using at least one path in the set of standby paths include:
instructions for determining a first path within the set of primary paths;

instructions for issuing a transaction to the device using the first path; and instructions, responsive to the transaction failing, for marking the first path as down or inactive and configuring the path control manager to issue transactions to the set of standby paths.

19. The computer program product of claim 17, wherein the instructions for failing over using at least one path in the set of standby paths include:

instructions for determining a first path within the set of primary paths;

instructions for issuing a transaction to the device using the first path;

instructions, responsive to the transaction failing, for marking the first path as down or inactive;

determining a second path within the set of standby paths; and instructions for issuing the transaction to the device using the second path, wherein the path control module remains configured to use the set of primary paths to issue transactions.

20. The computer program product of claim 17, wherein the path control module is a dynamically loaded extension of a device driver for the device.

* * * * *